United States Patent [19]
Wilamowski

[11] 3,906,639
[45] Sept. 23, 1975

[54] GEOMETRICAL MEASUREMENT DEVICES

[76] Inventor: George Wilamowski, 4818 Wegg, East Chicago, Ind. 46312

[22] Filed: Aug. 22, 1973

[21] Appl. No.: 390,528

Related U.S. Application Data

[60] Division of Ser. No. 158,193, June 30, 1971, Pat. No. 3,805,397, which is a continuation-in-part of Ser. No. 12,286, Feb. 18, 1970, abandoned, which is a continuation-in-part of Ser. No. 789,128, Jan. 6, 1969, Pat. No. 3,562,773.

[52] U.S. Cl. ..................... 33/191; 33/27 C; 33/158
[51] Int. Cl. ............................................... B25h 7/04
[58] Field of Search ........ 33/191, 160, 158, DIG. 9, 33/174 Q, 147 T, 147 J, 27 C, 164 C, 164 D, 147 K, 159, 143 J, 143 M, 143 K

[56] References Cited
UNITED STATES PATENTS

| | | | |
|---|---|---|---|
| 352,693 | 11/1886 | Irving | 33/191 X |
| 364,913 | 6/1887 | Emery | 33/164 D |
| 1,029,386 | 6/1912 | Mays | 33/191 |
| 1,219,141 | 3/1917 | Nelson | 33/159 |
| 1,286,312 | 12/1918 | Hertle | 33/95 |
| 1,888,416 | 11/1932 | Williams | 33/143 M |
| 2,741,848 | 4/1956 | Livingston | 33/167 |
| 3,025,609 | 3/1962 | Hendrix | 33/191 |

FOREIGN PATENTS OR APPLICATIONS

| | | | |
|---|---|---|---|
| 1,548,272 | 7/1969 | Germany | 33/147 T |
| 142,641 | 5/1920 | United Kingdom | 33/191 |

*Primary Examiner*—Richard E. Aegerter
*Assistant Examiner*—Charles E. Phillips
*Attorney, Agent, or Firm*—Hill, Gross, Simpson, Van Santen, Steadman, Chiara & Simpson

[57] ABSTRACT

Geometrical measurement devices are provided especially useful for machinists in locating cylinder axes of arcuate edges formed on workpieces. Graduated scale bars are joined in adjustable 90° relationship by a clamping block and at least one of the scale bars has a gauging member supporting longitudinally adjustably on its distal or outer end portion and provided with a fine line contact surface centered on the longitudinal axis of the scale bar and disposed for engagement with an opposing surface on a workpiece. A beam-trammel is removably supported by the clamping block for pivotal movement about the cylinder axis at intersection of the longitudinal axes of the scale bars. The beam trammel is adapted not only for its use in scribing radial distances from the cylinder axis, but also for use in obtaining measurement of difficult inside bore diameters under conditions precluding use of an inside caliper.

4 Claims, 6 Drawing Figures

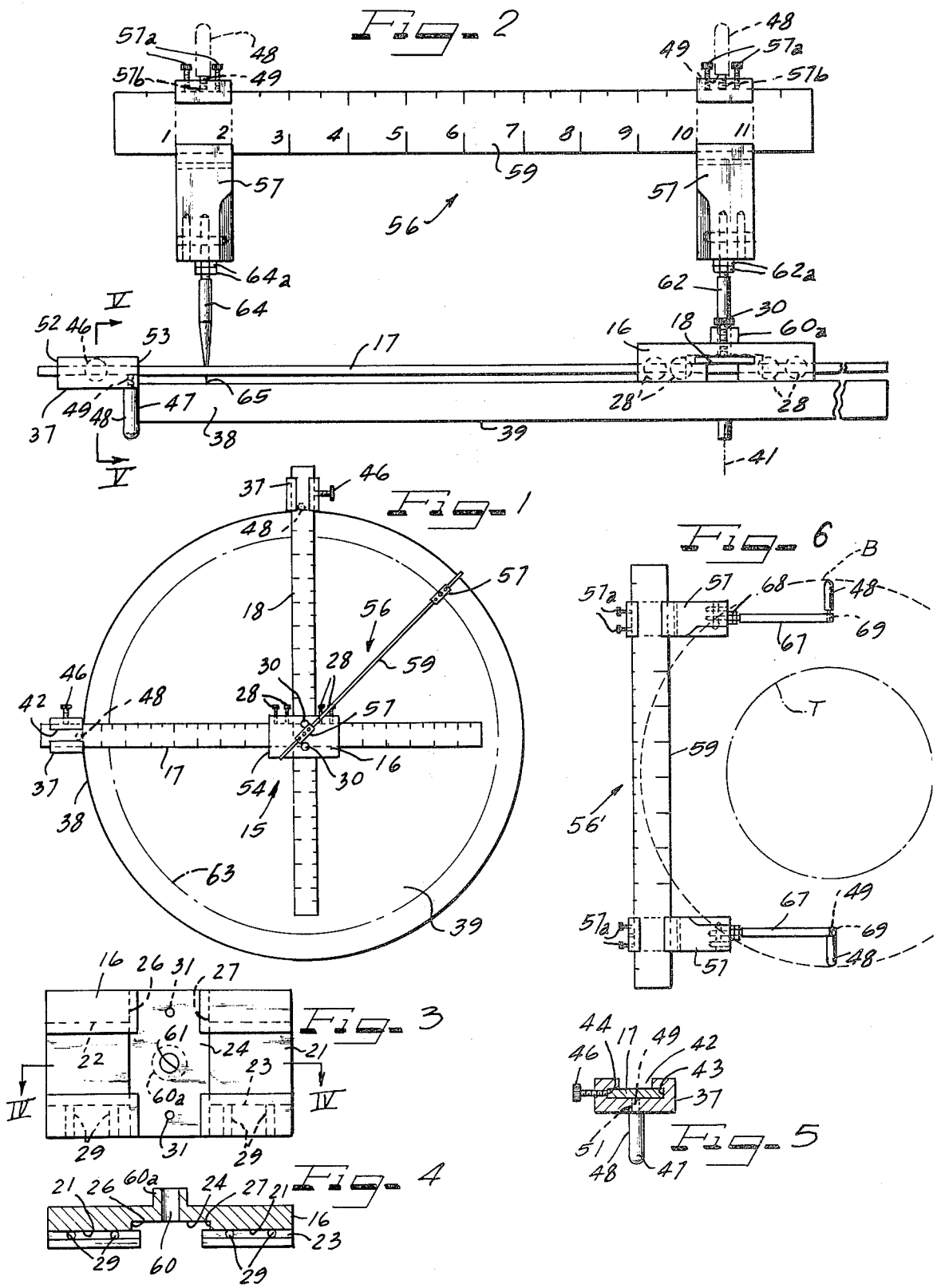

3,906,639

GEOMETRICAL MEASUREMENT DEVICES

CROSS REFERENCE TO RELATED APPLICATIONS

This application is a division of my co-pending application Ser. No. 158,193, filed June 30, 1971, now U.S. Pat. No. 3,805,397 which is a continuation-in-part of application co-pending therewith, Ser. No. 12,286, filed Feb. 18, 1970, now abandoned, and which was a continuation-in-part of application co-pending therewith, Ser. No. 789,128, filed Jan. 6, 1969, now U.S. Pat. No. 3,562,733.

BACKGROUND OF THE INVENTION

1. Field of the Invention

This invention relates generally to geometrical devices, and is more particularly concerned with such devices especially useful for locating cylinder axes of arcuate edges of workpieces, and for determining other measurements.

2. Brief Description of the Prior Art

A machinist is oftentimes required to locate a cylinder axis of an arcuate edge surface or arcuate line on a workpiece for the purpose of measuring and locating points disposed a certain radial distance from the located axis. A simple and inexpensive instrument enabling a machinist to conveniently locate the cylinder axis of the arcuate portion could greatly reduce the time necessary for several machine operations.

A particular problem exists with respect to annular workpieces, or workpieces that may have been roughed out into approximate circularity but require that a perfectly circular dimension be provided thereon, since those types of workpieces have either no central portion on which a mark may be placed to indicate the location of the axis or may lack a perfectly circular edge to serve as a guide. Prior art of which I am aware has generally not provided simple devices for locating the cylinder axis of an annular portion or of a workpiece on which there is only an imperfect edge such as a merely roughed out piece, and enabling radial measurements from the located axis or point representing the axis. Neither has there been any simple means for measuring bores without removing the boring tools.

SUMMARY OF THE INVENTION

A geometrical measuring device, constructed in accordance with the principles of the present invention, for locating a cylinder axis of an arcuate portion or perimeter, whether an inside or outside diameter surface, on a workpiece has clamping means joining two or more scale bars together adjustably at 90°. This angular relationship enables a machinist to measure simultaneously two radial distances from the arcuate portion in a manner to position the point of intersection of longitudinal axes of the joined scale bars at the cylinder axis of the arcuate portion, assisted by gauging means comprising a gauging member longitudinally adjustably supported on the distal or outer end portion of at least one of the scale bars and having a fine line contact surface centered on the longitudinal axis of such bar and disposed for engagement with an opposing surface on the workpiece. For utmost accuracy on a perfectly circular perimeter it is preferable to rotate the joined scale bars so that measurements may be taken at a muliplicity of circumferentially spaced points to ensure that the axis is properly located.

In order to enable readily marking a circular or arcuate line on the workpiece concentric with the axis of the arcuate portion and to enable readily measuring and marking radial distances on an annular portion or workpiece, the clamping means include means supporting a beam-compass, also referred to as a trammel, for pivotal movement about the located axis.

An assembly of parts of the device and trammel for enabling accurate gauging of inside diameters difficult to reach by conventional inside calipers, is also provided.

BRIEF DESCRIPTION OF THE DRAWINGS

FIG. 1 is a top plan view of a geometrical measuring device embodying features of the present invention and including a beam-trammel instrument for marking arcuate line portions about a cylinder axis of a workpiece;

FIG. 2 is an enlarged fragmental elevational view of the measuring instrument illustrated in FIG. 1;

FIG. 3 is a bottom plan view of the clamping block member of the device;

FIG. 4 is a sectional view taken substantially along line IV—IV of FIG. 3;

FIG. 5 is a sectional view taken substantially along line V—V of FIG. 2; and

FIG. 6 is a side elevational view of a combination of parts or elements of the device and the beam-trimmel enabling especially inside diameter gauging.

DESCRIPTION OF THE ILLUSTRATED EMBODIMENTS

In FIGS. 1 through 5, inclusive, there is shown a geometrical measurement device 15 constructed and arranged to enable readily locating a cylinder axis or center point of an arcuate portion perimeter or circular line formed on a workpiece. The device comprises clamping means 16 joining a pair of graduated scale bars 17 and 18 in a 90° crossed relation. The bars are desirably provided with graduated scales into any convenient measuring system by transversely extending markings as at 19.

The clamping means 16 comprise a rectangular flattened block member preferably elongated in one dimension having a first recess channel or slot 21 formed in one face surface thereof and extending in the long dimension of the member. This recess 21 is characterized by being narrower than the bars 17 and 18 and having a pair of opposed, undercut grooves 22 and 23, spaced apart a distance to slidably guidedly receive the scale bar 17, which may have a standard one-inch width. A second similar recess channel or slot 24 extends at 90° to the first slot 21 and is recessed therebelow, having opposed, undercut grooves 26 and 27 for receiving the scale bar 18 in a crossed arrangement relative to the bar 17. With the scale bars 17 and 18 properly inserted, respectively, into the recesses 21 and 24, longitudinal axes of the scales intersect at a preferred cylinder axis of the clamping means 16.

In order to clampingly secure the bars 17 and 18 relatively adjustably in their respective slots, suitable thumb screws are desirably provided. By having one of the bars, namely, the bar 17, mounted in the slot 21 which is longitudinal with the longest and narrowest dimension of the clamping bar 16, it is possible to secure the bars 17 by means of thumb screws 28 threaded into and through respective bores 29 extending inwardly from one edge of the bar and aligned with one of the undercut grooves, herein the groove 23. By having a pair of the thumb screws 28 in securing engagement with the edge of the bar 17, in each portion of the slot 21 bisected by the slot 24, an extremely stable attachment of the bar 17 to the block 16 is attained. Moreover, it is possible, where desirable, to have one or two shorter bar sections each of which may terminate short of the center of the block 16 to provide a clearance, if desired.

Adjusted and adjustable securement of the bar 18, or sectional portions of such bar, is adapted to be effected by means of a respective thumb screw 30 threaded through a respective bore 31 of which there are desirably two, one of which is adjacent to each opposite end of the slot 24.

According to the present invention gauging means comprising at least one, and preferably identical respective adjustable gauging abutment blocks 37 are slidably received on the distal end portions of the scale bars 17 and 18 for engagement against an arcuate edge portion as at 38 formed on a workpiece 39, thereby to facilitate properly positioning the clamping block 16 with its cylinder axis accurately positioned where desired, such as colinear or concentric with a cylinder axis 41 of the arcuate portion. Each of the blocks 37 includes a member having a scale bar slot recess 42 formed in an upper face surface thereof and characterized by a pair of opposed, undercut grooves 43 and 44 dimensioned to slidably receive one of the scale bars 17 or 18. At least one thumb screw 46 is threaded into the side of the block 37 to engage an edge surface of the scale bar 17 or 18, thereby enabling the block 37 to be fixedly clamped to the scale bar at a desired adjusted position thereon.

In order to provide a centered point contact with the arcuate portion 38, a cylindrical fine line contact surface 47 is provided on each block 37 centered on the longitudinal axis of its bar and desirably formed on a depending pin 48, which has a reduced, threaded end portion 49 received in a threaded aperture 51 formed in a solid underside wall portion of the block with the pin axis extending perpendicularly to the lower face surfaces of the scale bars 17 and 18, and thus parallel to the crossing axis of the scale bars in the clamping block 16. To facilitate reading of radial measurements on the scales of the bars 17 and 18, each of the gauge blocks 37 has a pair of parallel, opposite square end surfaces 52 and 53 extending across and registerable with the scales, and with the cylindrical surface 47 on the pin 48 tangent with the inner end edge 53.

When employing the device 15 in a manner to locate a preferably accurately aligned cylinder axis of the outwardly facing arcuate perimeter or edge portion 38 on the workpiece 39, the pair of scale bars 17 and 18 is clamped into the clamping block 16 in 90° crossed arrangement and the gauge blocks 37 are telescopically fitted over distal or outer end portions of the scale bars. The clamping block 16 may then be positioned with the crossing center of the bars 17 and 18 over the approximate cylinder axis 41 of the arcuate portion 38 and the pins 48 engaged against the arcuate portion. The respective positions of the blocks 37 along the scales of the bars 17 and 18 are then adjusted until equal measurements are obtained between the innermost and edge surfaces 53 and the opposed area of an outer edge surface 54 of the block 16, the known length and width of the block 16 being allowed for in reading the scales. When such equal measurements are obtained, the thumb screws 46 are tightened to lock the blocks 37 in their proper positions. Thereby, two circumferentially spaced points 90° apart on the arcuate edge portion 38 are simultaneously engaged to ensure locating the cylinder axis 41 properly. However, for utmost accuracy proper location of the axis may be checked by rotating the device and taking measurements at another pair of circumferentially spaced points on the edge 38.

When properly positioned, the cylinder axis of the clamping block 16 may be positioned concentrically with the cylinder axis 41 of the arcuate portion 38, although an eccentric axis is feasible by adjustments of the block 16 if desired. In a manner similar to that described hereinabove, a cylinder axis of an internal arcuate perimeter or portion, or of a center point of an arc or circular line may conveniently be located by a machinist or other user of the device 15.

It is also contemplated according to the principles of the present invention to provide means for supporting a beam-compass or trammel instrument 56 for pivotal movement about the located cylinder axis determined by the block 16 and the bars 17 and 18. This instrument 56 comprises a pair of beam heads, sliding sockets or trammel blocks 57 and a graduated scale bar 59 on which the pair of blocks is slidably received. The trammel blocks 57 may be constructed in accordance with the teachings of my copending U.S. Pat. No. 3,562,773. Means for accurately fastening the respective head blocks 57 to the bar 59 comprise a pair of spaced thumb screws 57a threaded into the head ends of these blocks in alignment with the socket portion in which an edge of the bar 59 is engaged. To attain utmost accuracy in the attachment, without any cocking of the block 57 relative to the bar 59 one of the pins 48 is desirably preliminarily engaged with its reduced diameter threaded end portion 49 in a threaded bore 57b which is located in centered relation between the screws 57a and is shorter than the portion 49 so that by driving the end of the threaded portion 49 of the pin 48 against the edge of the bar 59 the block 57 will be held in positive squared up clamping alignment with the bar edges. Then the retaining thumb screws 57a can be tightened uniformly against the adjacent bar edge to complete the squared up clamping action. Thereupon, the pin 48 can be removed for use on the other of the blocks 57, or returned to the block 37 from which removed, or placed in a spare parts receptacle. If convenient, or spares are available, of course, the pins 48 may be left on the blocks 57.

Means for supporting the instrument 56 include a cylindrical bore 60 formed in the clamping block 16 and having its axis disposed concentrially with the crossing axis of the clamping means and thus coaxially with the axis 41 whenever the clamping means is thus positioned as described hereinabove. The bore 60 may be formed in a raised embossment on the block 16. A mating cylindrical surface 61 on one of the trammel blocks 57 is fittingly received in the bore 60, thereby supporting such trammel block 57 for pivotal movement about the located axis 41. The cylindrical surface 61 may be formed on a depending pin 62 threadedly secured to the trammel block 57 and held locked by lock nuts 62a.

In order to scribe or otherwise mark a circular line as at 63 on the workpiece 39, a tapered pin 64 may be threadedly secured to the outer trammel block 57 and locked by lock nuts 64a so that a pointed end 65 of the pin engages the workpiece. Also, the pin 64 may be utilized conveniently to measure radial distances on the workpiece 39 relative to the located axis 41.

Thus, in accordance with the principles of the present invention, the instrument 15 enables a machinist to positively locate a cylinder axis of an arcuate portion or circular line formed on a workpiece and then to use the located axis as a pivot axis for scribing circular lines or for determining radial distances on the workpiece. Since the instrument 15 eliminates any necessity for placing a marking on the workpiece 39 to indicate the position of the located cylinder axis, the instrument 15 may readily be used for marking or determining radial distances on an annular workpiece which has no central portion. The instrument is also valuable in efficiently finding and laying out a chord dimension on a work piece, because once the 90° chord has been quickly found by means of the scale bars 17 and 18 any intermediate chord can be readily laid out from this, for example in laying out points on a circle on the work piece where holes are to be bored.

In FIG. 6 is shown a modified instrument 56' according to which the trammel blocks 57 and the bar 59 of the instrument 56 are adapted to be employed in an arrangement for gauging surfaces to which access is obstructed in some way such as newly bored hole represented by the circular dash line B while the boring tool represented by the dot dash line T is still in place and wherein it is desirable to take a check measurement or test caliper. To this end, each of the blocks 57 is adapted to be equipped with one of the pins or rods 62 or with a separate extension rod 67 threadedly engaged at one end with a distal end of the associated block 57 and locked thereto by lock nuts 68. The rods 67 are desirably coextensive, and are both equipped with a transverse threaded bore 69 on the distal end portion in which the threaded end portion 49 of one of the pins 48 is received and the pin tightened against the rod to extend normal thereto to serve as a dimension gauge. By having the pins 48 extend toward one another, outside dimensions may be gauged, but by having the pins 48 projecting away from one another, as shown, gauging of an inside dimension is facilitated.

The instrument 56' as used for gauging an inside dimension, for example, is adjusted by moving the blocks 57 toward one another sufficiently to enable clearance of the ends of the pins 48 into the bore to be measured. Then by having one of the blocks 57 secured fixedly to the bar 59, and with its pin 48 resting on the surface to be measured, the other of the blocks 57 is moved toward the adjacent portion of the surface to be measured until the pin 48 thereof engages the surface whereupon the block 57 is tightened. The distance between the tips of the pins 48 is thereby the dimension between the points on the surface to be measured, such as the diameter. Inasmuch as the pins 48 are threadedly mounted in the rods 67, micrometer fine adjustments can be made to find the exact dimension of the workpiece as, for example, by engaging the top of one of the pins 48 against the workpiece while such pin is tightly engaged with its rod 67 and the other of the pins 48 is slightly spaced from the workpiece, and then threadedly manipulating such other pin 48 to project from its rod 67 until its tip touches the workpiece. By then removing the device from the workpiece, and applying an outside caliper to the tips of the pins 48, an exact micrometer measurement of the diameter of the bore to be measured is obtained. In this instance, again, use may be made of the same pins 48 as used with the gauge blocks 37, or separate pins of a reserve supply of such pins may be used. Further, by coordinating the known dimensions of the pins 48 with the known dimensions of the blocks 57 and the scale on the bar 59, direct reading of measurements made by and through the pins 48 may be drived by proper adjustment of the blocks 57 relative to one another and along the scale bar 59.

Although minor modifications might be suggested by those versed in the art, it should be understood that I wish to embody within the scope of the patent warranted hereon all such modifications as reasonably and properly come within the scope of my contribution to the art.

I claim as my invention:

1. A measuring device comprising:

a pair of graduated scale bars having transversely extending upper face scale markings;

clamping means comprising a member having crossing recesses therein for receiving said bars and holding the bars in 90° orientation with the longitudinal axes thereof in crossing relation;

means for adjustably securing said bars in said recesses;

a gauging member longitudinally adjustably supported on the distal end portion of at least one of said bars and having an edge extending transversely across said one bar and selectively alignable with said scale markings on said one scale bar;

a contact pin extending downwardly from a lower face of said gauging member and provided with a fine line contact surface aligned with said edge and centered on the longitudinal axis of said one bar for engagement with an opposing surface on a work piece;

said gauging member being reversible on said one bar so that said contact surface can be engaged selectively alternately with an outside surface of a work piece or an inside surface of a work piece over which the device is placed for making desired measurements;

said pin having a reduced diameter threaded end portion and said gauging member having a threaded aperture located in centered alignment normal to the axis of the supporting bar and adjacent to said edge and within which said reduced diameter portion of the contact pin is removably threadedly engageable;

a trammel having means for mounting it on said clamping member and including a block and a beam bar, said block having a beam slot within which the beam is adjustably slidable;

a pair of spaced apart thumb screws threadedly mounted in said trammel block to engage the beam bar; and a threaded hole in said trammel block centered between and parallel to said thumb screws and receptive of the reduced diameter threaded end portion of said pin when removed from said member, said reduced diameter end portion being of a length when threaded into said bore between said thumb screws to lock the beam bar in an adjusted position relative to the trammel block whereafter the thumb screws can be tightened to maintain the adjustment, and the pin then removed.

2. A measuring device according to claim 1, wherein said clamping member comprises a block having a boss thereon provided with a cylindrical bearing bore located in alignment with the crossing of said longitudinal axes, and the trammel block including a pivot pin engaged in said bore.

3. A measuring device comprising:

a pair of graduated scale bars having transversely extending upper face scale markings;

clamping means comprising a member having crossing recesses therein for receiving said bars and holding the bars in 90° orientation with the longitudinal axes thereof in crossing relation;

means for adjustably securing said bars in said recesses;

a respective gauging member longitudinally adjustably supported on the distal end portion of each of said bars and each of said gauging members having an edge extending transversely across the bar and being selectively alignable with the scale markings;

a removably threadedly engaged contact pin extending downwardly from a lower face of each of said gauging members and provided with a fine line contact surface aligned with said edge and centered on the longitudinal axis of its bar for engagement with an opposing surface on a work piece;

said gauging members being reversible on said bars so that said contact surfaces can be engaged selectively alternately with an outside surface of a work piece or an inside surface of a work piece over which the device is placed for making desired measurements;

a trammel having trammel blocks engaged upon a beam and one of said trammel blocks having means removable from said trammel for removably pivotally mounting the trammel on said clamping member;

respective extension rods;

means on said trammel blocks and on said rods for mounting the rods respectively on said trammel blocks when the trammel is removed from said clamping member and said means removable from the trammel is removed;

the rods extending in parallel relation to one another from the trammel blocks;

threaded transverse screw holes in distal end portions of said extension rods; and said pins being removable from said gauging blocks and having threaded end portions engageable in said screw holes so that the pins will extend laterally from said rods, whereby the trammel is useable as a diameter measurement finding instrument with the tips of the pins serving as dimension gauges.

4. A measuring device according to claim 3, wherein said clamping member comprises a block having a boss thereon provided with a cylindrical bearing bore having its axis located in alignment with the crossing of said longitudinal axes, and said means removable from said trammel comprising a pivot pin engageable in said bore for supporting the trammel on the block for pivotal movement on and about said bore axis.

* * * * *